(12) United States Patent
Alakontiola et al.

(10) Patent No.: US 9,046,972 B2
(45) Date of Patent: Jun. 2, 2015

(54) STRUCTURE FOR A TACTILE DISPLAY

(75) Inventors: Heikki Tapani Alakontiola, Oulu (FI);
Mikael Kontkanen, Ilmarinen (FI)

(73) Assignee: Nokia Technologies Oy, Espoo (FI)

( * ) Notice: Subject to any disclaimer, the term of this patent is extended or adjusted under 35 U.S.C. 154(b) by 610 days.

(21) Appl. No.: 13/428,317

(22) Filed: Mar. 23, 2012

(65) Prior Publication Data
US 2013/0250491 A1    Sep. 26, 2013

(51) Int. Cl.
| | |
|---|---|
| *H01L 41/09* | (2006.01) |
| *H01L 41/22* | (2013.01) |
| *G06F 3/00* | (2006.01) |
| *G06F 3/041* | (2006.01) |
| *G06F 3/044* | (2006.01) |
| *G06F 3/045* | (2006.01) |
| *G06F 1/16* | (2006.01) |
| *G06F 3/01* | (2006.01) |
| *H04M 1/02* | (2006.01) |

(52) U.S. Cl.
CPC .............. *G06F 3/044* (2013.01); *G06F 3/045* (2013.01); *G06F 1/1626* (2013.01); *G06F 1/1637* (2013.01); *G06F 3/016* (2013.01); *G06F 3/041* (2013.01); *H04M 1/0266* (2013.01)

(58) Field of Classification Search
USPC ......... 310/311, 329, 330–332, 338, 345, 348, 310/351, 352; 29/25.35; 715/700–735; 345/173, 174, 177, 208
See application file for complete search history.

(56) References Cited

U.S. PATENT DOCUMENTS

| | | | |
|---|---|---|---|
| 7,463,734 B2 | 12/2008 | Tolbert et al. | 379/433.04 |
| 7,525,769 B2 | 4/2009 | Yao et al. | 360/294.4 |
| 7,710,402 B2 | 5/2010 | Takenaka et al. | 345/173 |
| 7,911,455 B2 | 3/2011 | Nishikawa et al. | 345/173 |
| 8,427,441 B2 * | 4/2013 | Paleczny et al. | 345/173 |
| 2007/0063982 A1 | 3/2007 | Tran | 345/173 |
| 2010/0156814 A1 | 6/2010 | Weber et al. | 345/173 |
| 2010/0225600 A1 | 9/2010 | Dai et al. | 245/173 |
| 2011/0050596 A1 | 3/2011 | Park et al. | 345/173 |
| 2013/0285801 A1* | 10/2013 | Jung et al. | 340/407.2 |

FOREIGN PATENT DOCUMENTS

| | | |
|---|---|---|
| EP | 1544720 A1 | 6/2005 |
| EP | 2241960 A1 | 10/2010 |
| WO | WO-2006/121638 A2 | 11/2006 |
| WO | WO-2009/052028 A2 | 4/2009 |

OTHER PUBLICATIONS

Dunbar, Terry; "Increased Accuracy and Speed with Piezo Dispensing," Nordson EFD, East Providence, RI, 2012 (3 pages) http://us-tech.com/RelId/856199/ISvars/default/Increased_Accuracy_and_Speed_with_Piezo_Dispensing.htm

* cited by examiner

*Primary Examiner* — Thomas Dougherty
(74) *Attorney, Agent, or Firm* — Harrington & Smith

(57) ABSTRACT

In accordance with the exemplary embodiments there is at least an apparatus including a multi-layer graphical user interface stack, a piezoelectric material disposed on a suspending member and attached to the multi-layer graphical user interface stack by a first bonding member, in which the suspending member includes a lateral section substantially perpendicular to a direction of actuation of the piezoelectric material, and vertical sections outboard of the lateral section extending substantially parallel to the direction of actuation and configured for mounting to a frame of a host device.

18 Claims, 5 Drawing Sheets

STRUCTURE FOR A TACTILE DISPLAY

TECHNICAL FIELD

This invention relates generally to user interfaces on electronic devices, and more particularly relates to mechanical structures for tactile displays such as touch-sensitive user interfaces and/or tactile audio stack interfaces.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Tactile displays are known in the art and research in this area is particularly advanced in the regime of mobile phones/terminals, but such displays are also used in other non-radio types of user devices. Tactile displays are used for receiving user inputs at a touch-sensitive graphical display interface, for providing haptic feedback, and for transducing electrical signals to sound waves. Increasingly a single tactile display will combine multiple ones of these different functions.

FIG. 1 herein reproduces FIG. 1 of US Patent Application 2010/0225600. A touch sensitive lens 106 has touch sensors 110 integrated to a surface 108 or 109 which generate a signal in response to haptic input from a user. The user interface can also have a display bezel 118 that provides a back plate 120 for securely holding a light emitting display 114, and a speaker 122 which responds to vibrations generated by piezoelectric elements 126. These piezoelectric elements 126 cooperate to provide an actuator 124. A phone chassis 128 is positioned away and spaced from the piezoelectric elements, and a housing 132 holds the phone chassis and display structure (touch sensitive lens, light emitting display, bezel and piezoelectric elements). Gaskets 134, 140 space an upper peripheral portion 136 of the phone chassis from a peripheral back portion 138 of the bezel of the display module, and space a lower peripheral portion 142 of the phone chassis from a lower ledge 144 of the housing.

Detailed below are structural improvements to the display structure shown at FIG. 1.

SUMMARY

In a first exemplary aspect of the invention there is an apparatus comprising: a multi-layer graphical user interface stack; and a piezoelectric material disposed on a suspending member and attached to the multi-layer graphical user interface stack by a first bonding member. The suspending member comprises: a lateral section substantially perpendicular to a direction of actuation of the piezoelectric material; and vertical sections outboard of the lateral section extending substantially parallel to the direction of actuation and configured for mounting to a frame of a host device.

In a second exemplary aspect of the invention there is a method which includes the following:
  disposing a multi-layer graphical user interface stack within a frame of a host device so as to define spaces between outboard edges of the multi-layer graphical user interface stack and adjacent inboard edges of the frame; fixing a lateral section of a suspending member to the graphical user interface stack by a first bonding member;
  fixing distal ends of vertical sections of the suspending member to a frame of a host device by a second bonding member, in which the vertical sections are outboard of the lateral section; and
  fixing a piezoelectric material to the lateral section of the suspending member.

The lateral section of the suspending member extends substantially perpendicular to a direction of actuation of the piezoelectric material and the vertical sections of the suspending member are substantially parallel to the direction of actuation.

DETAILED DESCRIPTION

Figure 1:
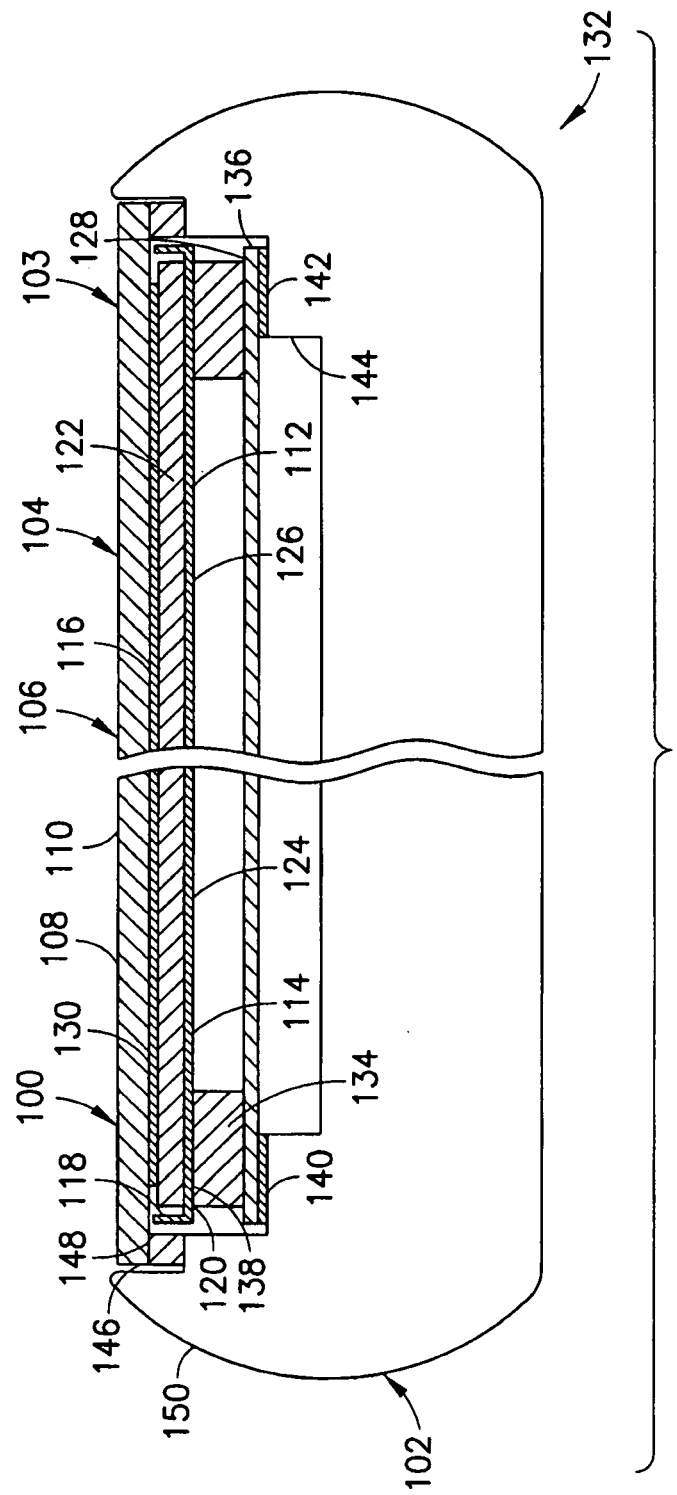
FIG. 1 is a prior art sectional view of a display structure detailed in US Patent Application Publication No. 2010/0225600 and presented there also as FIG. 1.

The arrangement set forth at prior art FIG. 1 is seen to be subject to improvement in two areas. Firstly, the lens 106 is directly mounted via gasket 146 to the housing 132 at a lower peripheral edge 148 while the piezoelectric actuator 124 is mounted via gaskets 134, 140 and phone chassis 128 to the housing at a lower ledge 144. If by chance a user were to drop the overall device such that the impact would cause a force in the horizontal direction respecting FIG. 1, either or both of those are subject to failure for separation from the housing 132 and/or from one another. Additionally, there is illustrated at FIG. 1 a space between the outboard edges of the lens 106 and the nearest inboard edges of the housing 132. Such a space is an avenue by which dust, moisture and small external particles may enter and potentially disrupt layer bonding and/or electrical connections of the display stack. Below are non-limiting embodiments which solve each of these issues and which may be employed individually and separately in different host devices such as for example mobile terminals/phones, or these different embodiments may be deployed together in a singular host device.

Figure 2:
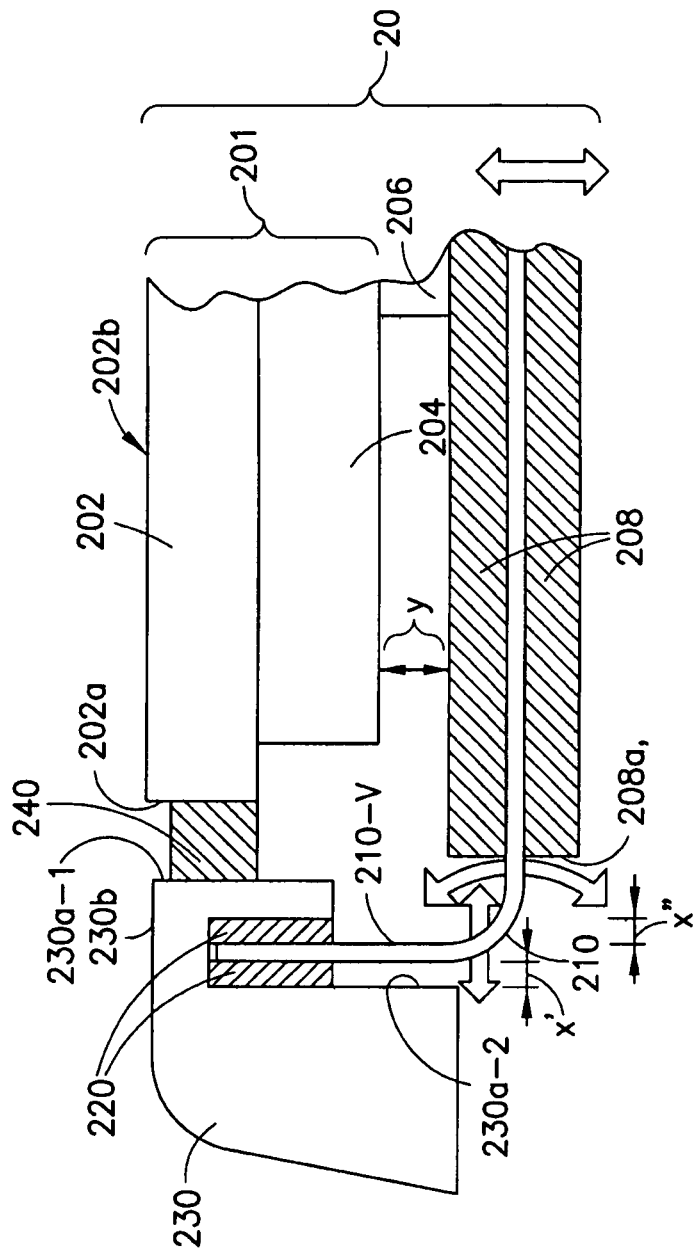
FIG. 2 is a sectional view similar to a portion of FIG. 1 but showing a suspending member for supporting a multi-layer graphical user interface stack to a host device frame according to a non-limiting embodiment of these teachings.

FIG. 2 is a sectional view of a multi-layered display stack 200, illustrating a view similar to that of the upper left corner of FIG. 1 for better clarity of some of the inventive aspects of these teachings. FIG. 2 illustrates, in addition to the display stack 200 and separate therefrom, a frame 230 or housing, and a second bonding member 220 for fixedly attaching the display stack 200 to the frame 230.

The display stack 200 may include a protective cover 202 as is known in the art, and a touch sensitive graphical user interface GUI 204 which for clarity of the novel aspects herein is illustrated simply as a single layer but in practice may be a multi-layered structure for providing graphical information to a user and for receiving user touch inputs. For conciseness the cover 202 and GUI 204 are referred to as a multi-layer GUI stack 201, which may include more than only those two layers 202, 204 as is detailed by example below.

By example the touch-sensitive graphical user interface 204 includes an organic light emitting display OLED for outputting light to a transparent lens or window (such as the cover 202 but in some embodiments it may be in addition thereto), and may also vibrate to produce sound as a speaker. Resistive liquid crystal display LCD touch screen GUIs often comprise a flexible top layer and a rigid bottom layer separated by insulating dots which are attached to a touchscreen controller. Facing surfaces of each of these two layers may be coated with a transparent metal oxide coating (indium tin-oxide ITO for example) that facilitates a gradient across each layer when voltage is applied. Pressing the flexible top sheet creates electrical contact between the resistive layers, closing a switch in the circuit. Control electronics alternate voltage between the layers and pass the resulting two-dimensional touch coordinates to the touchscreen controller. The touch-screen controller data is then passed on to the computer operating system for processing. There are also capacitive touch screen GUIs which operate on slightly different principles but produce similar results. The GUI 204 according to these teachings is not limited to resistive or capacitive technologies and may include other GUI technologies yet to be developed.

A first bonding member 206 defines an interstitial distance y in the actuation direction of a piezoelectric material 208, that interstitial distance y defining a space between adjacent (facing) surfaces of the GUI 204 and the piezoelectric material 208. In accordance with the exemplary embodiments, the distance y should be greater than a displacement of the actuator including any tolerance changes of member 206. For example, the distance y can be >0.2 mm. The entire assembly of the cover 202, GUI 204, first bonding member 206 and piezoelectric material 208 is supported relative to the housing or frame 230 of the host device by a suspending member 210 which FIG. 2 labels more particularly as a bended carrier 210.

As non-limiting examples, the piezoelectric material 208 can be single or dual sided and may include serial and parallel bimorph piezoelectric materials, such as may be formed by depositing piezo-ceramics onto a metal sheet (suspending member 210) which functions as a middle electrode of the bimorph structure using a sintering process.

Figure 3:
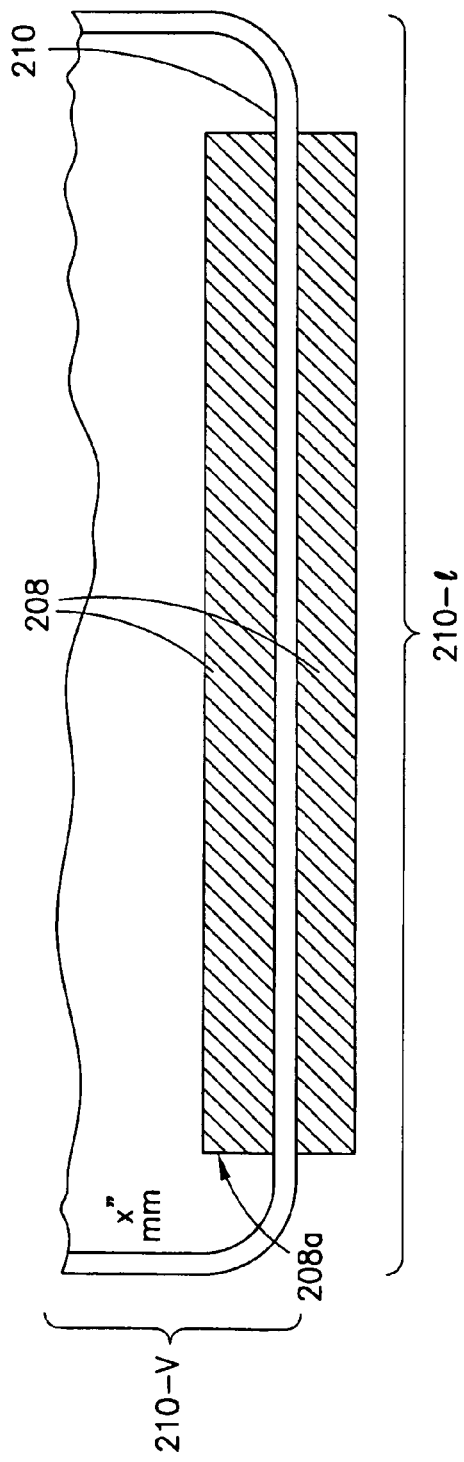
FIG. 3 is an isolated sectional view of the suspending member shown at FIG. 2 with a piezoelectric material affixed thereto.

As shown at FIG. 3, the suspending member 210 comprises three major sections; a lateral section 201-1 which runs substantially perpendicular to the direction of actuation of the piezoelectric material 208, and two outboard vertical sections 201-v which run substantially parallel to the direction of actuation of the piezoelectric material 208. The direction of actuation is shown at FIG. 2 by a directional arrow labeled as such. In a non-limiting embodiment the suspending member 210 is formed of a bent metal such as aluminum or an alloy thereof and serves as an electrical ground terminal to the piezoelectric material 208.

Figure 6:
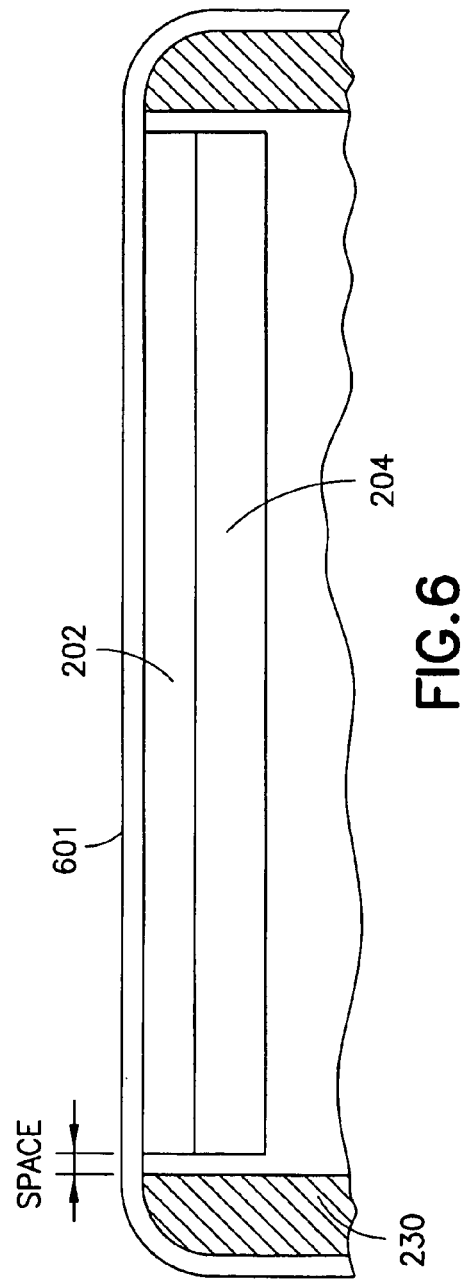
FIG. 6 is a sectional view of a multi-layer graphical user interface stack mounted in a host device and a protective layer disposed to cover spaces therebetween according to a non-limiting embodiment of these teachings.

Returning to FIG. 2, the suspending member 210 supports the GUI 204 and cover 202 such that the exterior surface 202b of the cover is substantially co-planar with an exterior surface 230b of the frame in the immediate area where these two surfaces are most proximal to one another, and also such that an outboard edge 202a of the cover 202 is spaced from an inboard edge 230a-1 of the frame 230 to allow movement of the cover 202 and GUI 204 in the direction of actuation without friction against the frame 230. There may be a foam or other type of flexible gasket 240 disposed between these facing edges 202a, 230a-1 to keep out debris. Detailed below with reference to FIG. 6 is an alternative to such a gasket 240.

The piezoelectric material 208 is disposed on the suspending member 210 such that an outboard edge 202a of the piezoelectric material is spaced a finite distance or gap x" from the adjacent vertical section 210-v (also FIG. 3). Additionally, the suspending member 210 is disposed in the frame 230 such that the vertical section 210-v (FIG. 3) is spaced from a nearest inboard edge 230a-2 of the frame 230 by a finite distance or gap x' (FIG. 2). The values for x' and x" may or may not be the same in various embodiments, and in some embodiments depending on the layout of the frame 230 it may be that the spacing x' for one vertical section 210-v is not identical to the similar spacing of the opposite vertical section of the same supporting member 210. In addition, the spacing or gap is related to a flexibility of member 240. In accordance with the embodiments, the spacing or gap can be 1 mm or smaller.

An advantage in the lateral gaps x' and x" is that if a user drops the host device and the resulting impact results in a lateral force (horizontal in FIG. 2; perpendicular to the direction of actuation), these gaps x', x" allow the entire multi-layered display stack 200 that is supported by the suspending member 210 to shift laterally somewhat due to flexibility of the vertical section 210-v, thus avoiding or mitigating shear forces which might separate layers of the multi-layer GUI stack 201 and/or the piezoelectric material from the supporting member 210. The above referenced gaps have a dimension which may be based on manufacturing capabilities of a piezo provider and/or a piezo strength. The lateral gap x' and/or x" can be varied from 0.7 mm to 15 mm. Further, in accordance with the exemplary embodiments, the vertical section 210-v can also be implemented at different angles. Such as an angle of the vertical section 210-v beginning at the bended carrier 210 (or suspending member 210), as shown in FIG. 2.

Figure 4A:
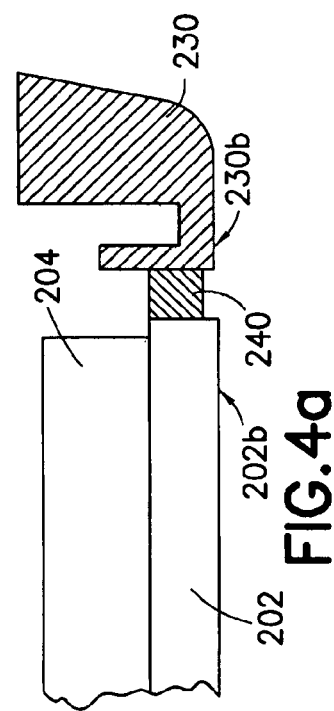
FIGS. 4a-d are progressive steps for making the suspending member supporting a multi-layer graphical user interface stack as shown in FIG. 2 and for mounting same to a frame of a host device according to a non-limiting embodiment of these teachings.
Figure 4B:
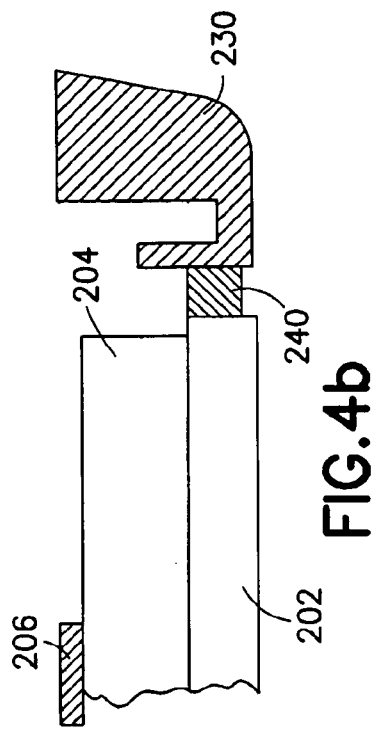
Figure 4C:
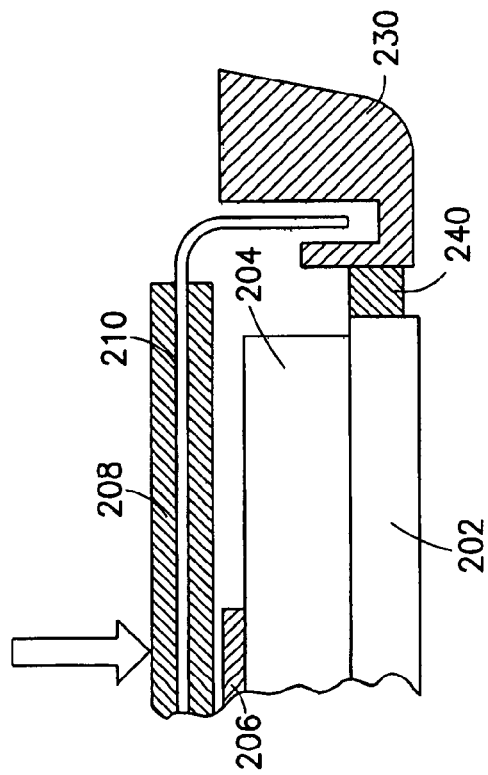
Figure 4D:
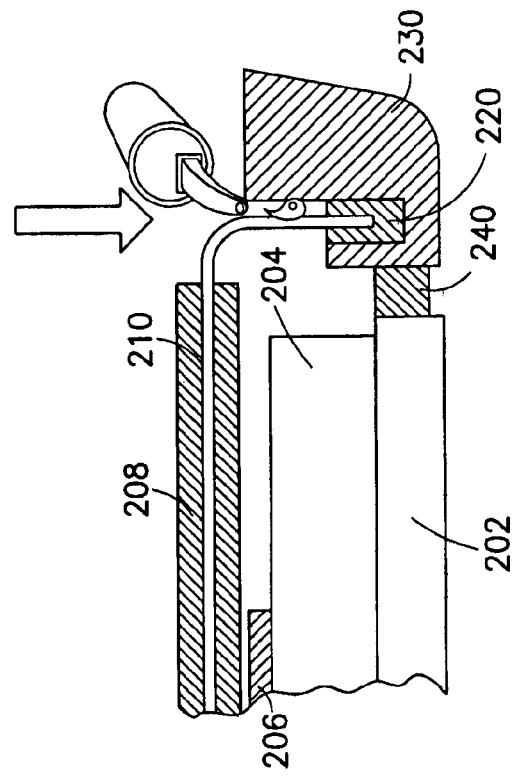

FIGS. 4a-d illustrate a method of assembling the multi-layered display stack 200 shown at FIG. 2 into the frame 230. FIGS. 4a-d illustrate the stack 200 and frame 230 inverted as compared to FIG. 2 but like reference numbers refer to like elements. FIG. 4a illustrates the cover 202 and GUI 204 being disposed with the frame 230 such that exterior surfaces 202b, 230b are substantially co-planar in the area in which they are immediately adjacent to one another. At FIG. 4b the first bonding member 206 is disposed on the GUI 204. For the case in which the first bonding member 206 is an adhesive, in one embodiment that adhesive is not set/cured until after FIG. 4d is complete. In another embodiment the first bonding member 206/adhesive is set/cured first to define the interstitial distance y and the vertical mounting position of the combined cover 202/GUI 204/piezoelectric material 208 and suspending member 210 is fixed relative to the frame 230 strictly by setting the vertical depth of the vertical sections 210-v as shown by example at FIG. 4d. In either case, once set the first bonding member 206 defines the value for the gap y (FIG. 2).

Next at FIG. 4c the suspending member 210 with the piezoelectric material 208 is disposed such that distal ends of the vertical sections 210-v (FIG. 3) extend into respective recesses of the housing or frame 230. At this juncture also the piezoelectric material 208 is also in contact with the first bonding member 206 and separated from the multi-layer GUI stack 201 by the interstitial distance y (FIG. 2).

The second bonding member 220 is added at FIG. 4d to fix the relation between the multi-layered stack 200 and the frame 230. If the first bonding member 206 is not yet cured FIG. 4d will also fix the interstitial distance y between the GUI 204 and the piezoelectric material 208 which is occupied at least across a portion of the 2-dimensional expanse by the first bonding member 206. Alternatively the piezoelectric material 208 may be attached to the lateral section 210-1 of the suspending member 210 after addition of the second bonding member 220 is complete. As illustrated the second bonding member 220 is also an adhesive but similar structural advantages are gained also if the first bonding member is changed to gap filling adhesive the second bonding member is mechanical such as a pin or rivet rather than chemical as in the adhesive.

The shape of the suspending member 210 is particularly adapted to allow the piezoelectric material 208 to bend in the direction of actuation (FIG. 2) according to its normal function due to the relatively wide expanse of the lateral section 210-1. If the host device should be dropped impact forces in this same direction are absorbed to a certain extent by the flex afforded in this same direction. But the shape also mitigates impact forces in the lateral direction (perpendicular to the direction of actuation) since also the vertical sections 210-v are able to flex to the extent there is a gap x' between the vertical section 210-v and the nearest inboard edge 230a-2 (FIG. 2) of the frame 230/housing. Mitigating these lateral forces alleviates stresses on the piezoelectric ceramics that might otherwise cause it to separate from its structural support, which in this case is the supporting member 210 but which in the prior art does not allow flex in the lateral direction. The supporting member 210 is flexible to the extent its shape may be deformed in the flex direction by finger pressure.

Figure 5:
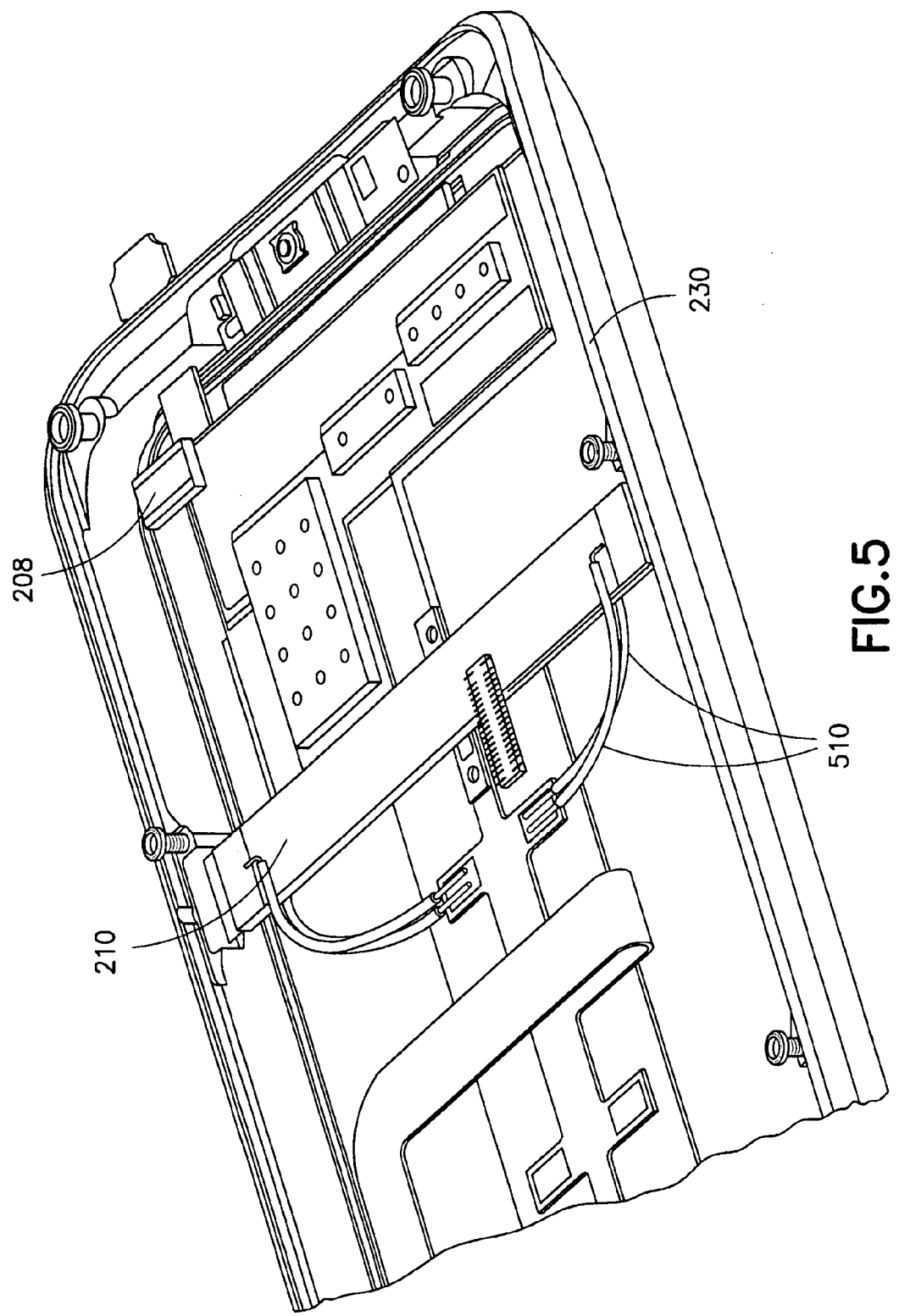
FIG. 5 is a perspective cutaway view of a frame of a host device and showing a suspending member somewhat similar to that of FIG. 2 mounted to the frame in accordance with a non-limiting embodiment of these teachings.

FIG. 5 illustrates a perspective cutaway of the frame 230 with only the supporting member 210 and piezoelectric material 208 shown; missing from FIG. 5 is the GUI 204 and cover 202 which if present would be in the foreground. Opposite that shown at FIG. 2, in the FIG. 5 embodiment the vertical sections 210-v extend downward into the frame 230, away from the GUI 204 but still parallel to the direction of actuation as in the FIG. 2 embodiment. FIG. 5 also illustrates leads 510 for applying current to the piezoelectric material 208 in the case of haptic feedback, and/or for measuring current in the piezoelectric material 208 in the case of sensing its deflection from a user input.

In the above examples there was a foam or other flexible gasket 240 disposed to seal the space between the outboard edge 202b of the cover 202 (and/or GUI 204/GUI stack 201) and the adjacent inboard edge 230a-1 of the frame 230 (FIG. 2). From a manufacturing perspective this is not the most efficient way to seal that space. That foam gasket needs to be precise and of quite small dimensions; typically that space will span between about 0.6 to 1.0 mm. Even with modern laser-cut precision to assure gaskets can be reliably cut to the needed tolerances, installation of such a gasket 240 is an added manufacturing step.

In some prior art implementations of a touch screen user interface stack the cover 202 is glass and there is an anti-splitter (or shatter) film (ASF) disposed between that glass cover 202 and the GUI 204 itself. In some of these prior art implementations this ASF penetrates into the frame 230 inboard edges 230a-1 so as to seal out dust and debris. ASF is elastomeric and so is able to move in the direction of actuation (FIG. 2) and not impede functional movement of the glass cover 202.

As shown at FIG. 6, according to an embodiment of these teachings there is a pliable film 601 disposed over that space and contiguously over the GUI 204 and/or any cover 202 that may be present (more generally, over the multi-layer GUI stack 201). As one non-limiting example, if the GUI 204 is an OLED display and the cover layer 202 is an optically clear adhesive (OCA) resin, the pliable film 601 may be a transparent thermoplastic film such as poly (methyl methacrylate) (PMMA), Polycarbonate (PC), and Polyester (PET), to name only a few types, at a thickness of between about (+/−10%) 0.15 and 0.2 mm. One example of a commercially available film suitable for this purpose is the polyolefin-based product sold under the trade name Touretec®, made by Toray Advanced Film Co., Ltd. of Tokyo, Japan.

At the above film thicknesses such a film would allow movement of 0.02 mm in the direction of actuation (FIG. 2) which is suitable for many current touch screen implementations. Movement of the cover 202/GUI 204 may be controlled by adjusting the thickness of that film 601, and/or by adjusting the expanse of the space between the cover 202/GUI 204 and the inboard edge 230a-1 of the frame. In that regard the thickness of the film 601 immediately over that space can be made thinner than other portions of the film 601. For example, the portion of the film 601 overlying the frame 230 may be 30 mm thick (and bonded with heat or pressure sensitive tape for example) whereas the thickness over the cover 202/GUI 204 may be a maximum of 2.0 mm and that film 601 portion directly over the space is thinner still. FIG. 6 illustrates only two opposed spaces but it is understood the space extends about the entire 2-dimensional periphery of the GUI stack.

According to the above teachings in one non-limiting embodiment there is an apparatus comprising a multi-layer graphical user interface stack 201; and a piezoelectric material 208 disposed on a suspending member 210 and attached to the multi-layer graphical user interface stack by a first bonding member 206. The suspending member comprises a lateral section 210-1 substantially perpendicular to a direction of actuation of the piezoelectric material; and vertical sections 210-v outboard of the lateral section extending substantially parallel to the direction of actuation and configured for mounting to a frame 230 of a host device.

In more specific non-limiting embodiments detailed above, the suspending member is a flexible metal; and/or the piezoelectric material is disposed on the lateral section of the suspending member so as to define a gap x'' between outboard edges 202a of the piezoelectric material and the vertical sections of the suspending member.

In another embodiment the apparatus is mounted to the frame 230 of the host device so as to define a further gap x' between the vertical sections of the suspending member and adjacent inboard edges 230a-2 of the frame; and/or distal ends of each vertical section are affixed to the frame of the host device by a second bonding member 220 (which may be an adhesive and the distal ends of each vertical section are disposed in respective recesses of the frame).

In one particular embodiment above the first bonding member defines an interstitial distance y between the piezoelectric material and the multi-layer graphical user interface stack in the direction of actuation. Above it was further detailed that the apparatus is mounted to the frame 230 of the host device so as to define a space between outboard edges 202a of the multi-layer graphical user interface stack and adjacent inboard edges 230a-1 of the frame 230; and further there is a protective film 601 overlying the multi-layer graphical interface stack 201 and the spaces and the inboard edges 230a-1 of the frame that are adjacent to the outboard edges 202a of the multi-layer stack. As detailed for FIG. 6, the film 601 may be pliable and define a first thickness over the multi-layer graphical interface stack 201 and a reduced second thickness over the spaces.

Also above with particular reference to FIGS. 4a-d there was detailed a method comprising: disposing a multi-layer graphical user interface stack 201 within a frame 230 of a host device so as to define spaces between outboard edges 202a of the multi-layer graphical user interface stack 201 and adjacent inboard edges 230a-1 of the frame 230; and fixing a lateral section 210-1 of a suspending member 210 to the graphical user interface stack 201 by a first bonding member 206; and fixing distal ends of vertical sections 210-v of the suspending member 210 to the frame 230 of a host device by a second bonding member 220 (in which the vertical sections are outboard of the lateral section); and fixing a piezoelectric material 208 to the lateral section 210-1 of the suspending member 210. The lateral section 210-1 of the suspending member 210 extends substantially perpendicular to a direction of actuation of the piezoelectric material 208 and the vertical sections 210-v of the suspending member 210 are substantially parallel to the direction of actuation.

In one non-limiting embodiment of this method the piezoelectric material 208 is fixed to the suspending member 210 prior to the suspending member being fixed to the multi-layer graphical user interface stack 201; and the first bonding member 206 is disposed between the piezoelectric material 208 and the multi-layer graphical interface stack 201.

In general, the various embodiments of the host device of which the frame 230 is a component can include, but are not limited to personal portable digital devices with or without wireless communication capabilities, such as but not limited to cellular telephones, navigation devices, laptop/palmtop/tablet computers, digital cameras, music devices, Internet appliances and gaming devices.

Various modifications and adaptations to the foregoing exemplary embodiments of this invention may become apparent to those skilled in the relevant arts in view of the foregoing description. Further, some of the various features of the above non-limiting embodiments may be used to advantage without the corresponding use of other described features; for example the novel aspects illustrated at FIG. 6 may be used with or without the novel features variously detailed with respect to FIGS. 1-5. The foregoing description should therefore be considered as merely illustrative of the principles, teachings and exemplary embodiments of this invention, and not in limitation thereof.

What is claimed is:

1. An apparatus comprising:
a multi-layer graphical user interface stack;
a piezoelectric material disposed on a suspending member and attached to the multi-layer graphical user interface stack by a first bonding member;
in which the suspending member comprises:
a lateral section substantially perpendicular to a direction of actuation of the piezoelectric material; and
vertical sections outboard of the lateral section extending substantially parallel to the direction of actuation and configured for mounting to a frame of a host device.

2. The apparatus according to claim 1, in which the suspending member is a flexible metal.

3. The apparatus according to claim 1, in which piezoelectric material is disposed on the lateral section of the suspending member so as to define a gap x" between outboard edges of the piezoelectric material and the vertical sections of the suspending member.

4. The apparatus according to claim 3, in which the apparatus is mounted to the frame of the host device so as to define a further gap x' between the vertical sections of the suspending member and adjacent inboard edges of the frame.

5. The apparatus according to claim 4, in which distal ends of each vertical section are affixed to the frame of the host device by a second bonding member.

6. The apparatus according to claim 5, in which the second bonding member is an adhesive and the distal ends of each vertical section are disposed in respective recesses of the frame.

7. The apparatus according to claim 1, in which the first bonding member defines an interstitial distance y between the piezoelectric material and the multi-layer graphical user interface stack in the direction of actuation.

8. The apparatus according to claim 1, in which the apparatus is mounted to the frame of the host device so as to define a space between outboard edges of the multi-layer graphical user interface stack and adjacent inboard edges of the frame;
and further comprising a protective film overlying the multi-layer graphical interface stack and the spaces and the inboard edges of the frame that are adjacent to the outboard edges of the multi-layer stack.

9. The apparatus according to claim 8, in which the protective film is pliable and defines a first thickness over the multi-layer graphical interface stack and a reduced second thickness over the spaces.

10. A method comprising:
disposing a multi-layer graphical user interface stack within a frame of a host device so as to define spaces between outboard edges of the multi-layer graphical user interface stack and adjacent inboard edges of the frame;
fixing a lateral section of a suspending member to the graphical user interface stack by a first bonding member;
fixing distal ends of vertical sections of the suspending member to the frame of the host device by a second bonding member, in which the vertical sections are outboard of the lateral section; and
fixing a piezoelectric material to the lateral section of the suspending member;
in which the lateral section of the suspending member extends substantially perpendicular to a direction of actuation of the piezoelectric material and the vertical sections of the suspending member are substantially parallel to the direction of actuation.

11. The method according to claim 10, in which the piezoelectric material is fixed to the suspending member prior to the suspending member being fixed to the multi-layer graphical user interface stack; and the first bonding member is disposed between the piezoelectric material and the multi-layer graphical interface stack.

12. The method according to claim 10, in which the suspending member is a flexible metal.

13. The method according to claim 10, in which piezoelectric material is fixed on the lateral section of the suspending member so as to define a gap x" between outboard edges of the piezoelectric material and the vertical sections of the suspending member.

14. The method according to claim 13, in which distal ends of the vertical sections of the suspending member are fixed to the frame of the host device so as to define a further gap x' between the vertical sections of the suspending member and adjacent inboard edges of the frame.

15. The method according to claim 14, in which the second bonding member is an adhesive and the distal ends of each vertical section are disposed in respective recesses of the frame.

16. The method according to claim 10, in which the first bonding member defines an interstitial distance y between the piezoelectric material and the multi-layer graphical user interface stack in the direction of actuation.

17. The method according to claim 10, the method further comprising:
   disposing a protective film overlying the multi-layer graphical interface stack and the spaces and the adjacent inboard edges of the frame.

18. The method according to claim 17, in which the protective film defines a first thickness over the multi-layer graphical interface stack and a reduced second thickness over the spaces.

\* \* \* \* \*